United States Patent

Chen

Patent Number: 5,271,158
Date of Patent: Dec. 21, 1993

[54] SAW BLADE ADJUSTING DEVICE

[76] Inventor: Chun-Chiung Chen, No. 11-5, Kuo Chung Rd., Ta Li Hsiang, Taichung, Taiwan

[21] Appl. No.: 16,525

[22] Filed: Feb. 11, 1993

[51] Int. Cl.⁵ ............................................. B27B 21/02
[52] U.S. Cl. ......................................... 30/508; 30/507
[58] Field of Search ........................... 30/507, 508, 513

[56] References Cited

U.S. PATENT DOCUMENTS

| | | | |
|---|---|---|---|
| 1,490,025 | 4/1924 | Reynolds | 30/513 |
| 2,048,627 | 7/1936 | Schmidt et al. | 30/513 |
| 2,399,869 | 5/1946 | Hough | 30/508 |
| 2,715,426 | 8/1955 | Morris | 30/508 |
| 3,329,186 | 7/1967 | David | 30/508 |

*Primary Examiner*—Douglas D. Watts
*Assistant Examiner*—Hwei-Siu Payer
*Attorney, Agent, or Firm*—Bacon & Thomas

[57] ABSTRACT

Disclosed is a saw blade adjusting device including an adjusting link fastened to a handle to hold either end of a saw blade, a toothed locating block fastened to a front block of the handle, a gear mounted on a rectangular block on the adjusting link and releasably meshed with the toothed locating block, and a spring mounted on the adjusting link and stopped between the gear and the handle, wherein the gear can be moved backwards along the adjusting link to disengage from the toothed locating block, then rotated in either direction to turn the saw blade through 360° angle via the adjusting link, and then moved back to its former position in mesh with the toothed locating block to hold the adjusting link in keeping the saw blade at the adjusted angular position.

1 Claim, 4 Drawing Sheets

SAW BLADE ADJUSTING DEVICE

BACKGROUND OF THE INVENTION

The present invention relates to hack saws, and more specifically the present invention relates to a saw blade adjusting device for adjusting the angular position of the saw blade of a hack saw conveniently.

A variety of hack saws are known and widely used for cutting things. FIG. 1 illustrates a regular hack saw which is generally comprised of a frame extendably fastened to a handle to hold a saw blade. The saw blade has two pin holes on two opposite ends thereof respectively mounted on a pin on a rod fastened to the handle and a pin on a screw rod fastened to the frame, and controlled by a wing nut. The tension of the saw blade is adjusted by turning the wing nut in either direction. Because the angular position of the saw blade is not adjustable, the hack saw shall be tilted while performing a bevel cutting. Tilting the hack saw during a bevel cutting may make the hand tired easily.

SUMMARY OF THE INVENTION

The present invention eliminates the aforesaid problem. It is therefore the main object of the present invention to provide a saw blade adjusting device which permits the saw blade of a hack saw to be conveniently adjusted to any desired angular position within 360° angle. According to the preferred embodiment of the present invention, the saw blade adjusting device comprises an adjusting link fastened to a handle to hold either end of a saw blade, a toothed locating block fastened to a front block on the handle, a gear mounted on a rectangular block on the adjusting link and releasably meshed with the toothed locating block, and a spring mounted on the adjusting link and stopped between the gear and the handle. The gear may be moved backwards along the adjusting link to disengage from the toothed locating block, then rotated in either direction to turn the saw blade through 360° angle via the adjusting link, and then moved back to its former position in mesh with the toothed locating block to hold the adjusting link in keeping the saw blade at the adjusted angular position.

DETAILED DESCRIPTION OF THE PREFERRED EMBODIMENT

Figure 1:
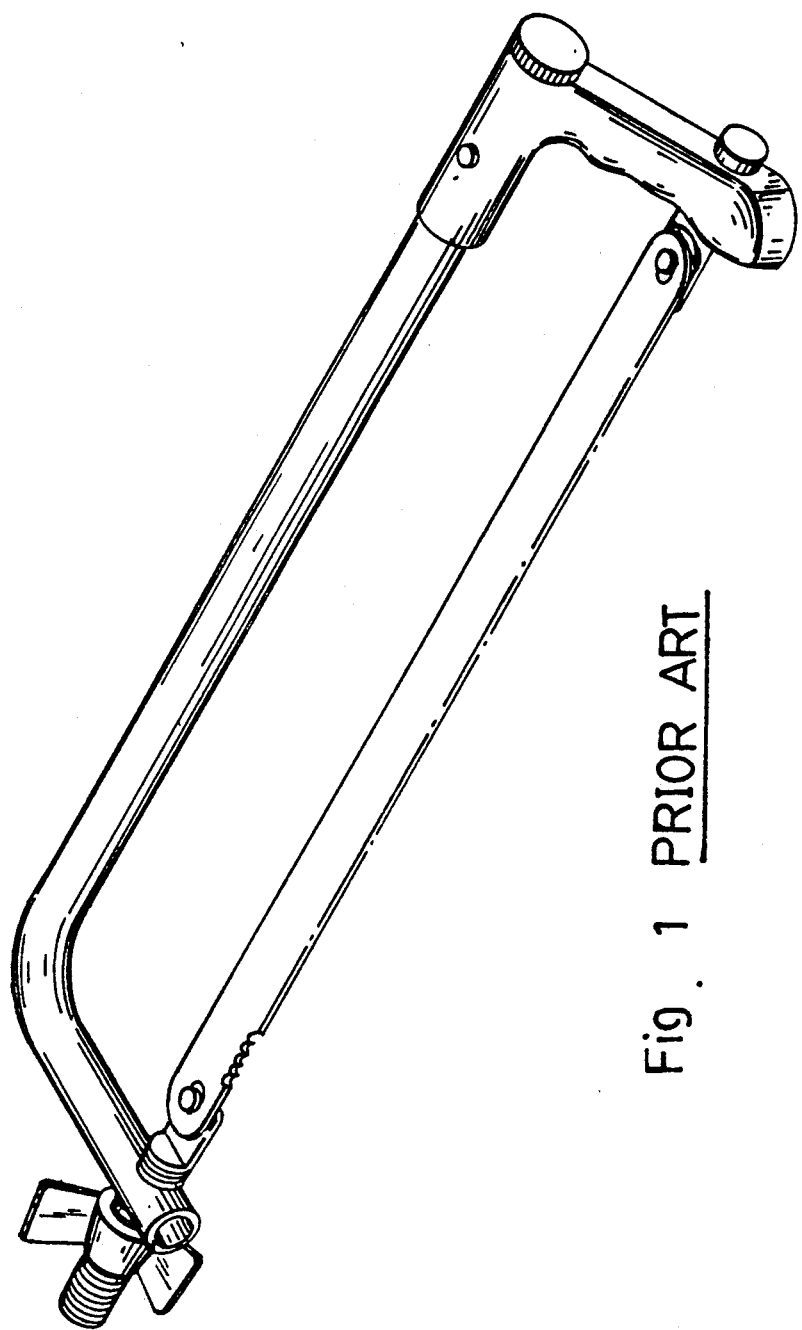
FIG. 1 is an elevational view of a hack saw according to the prior art.
Figure 2:
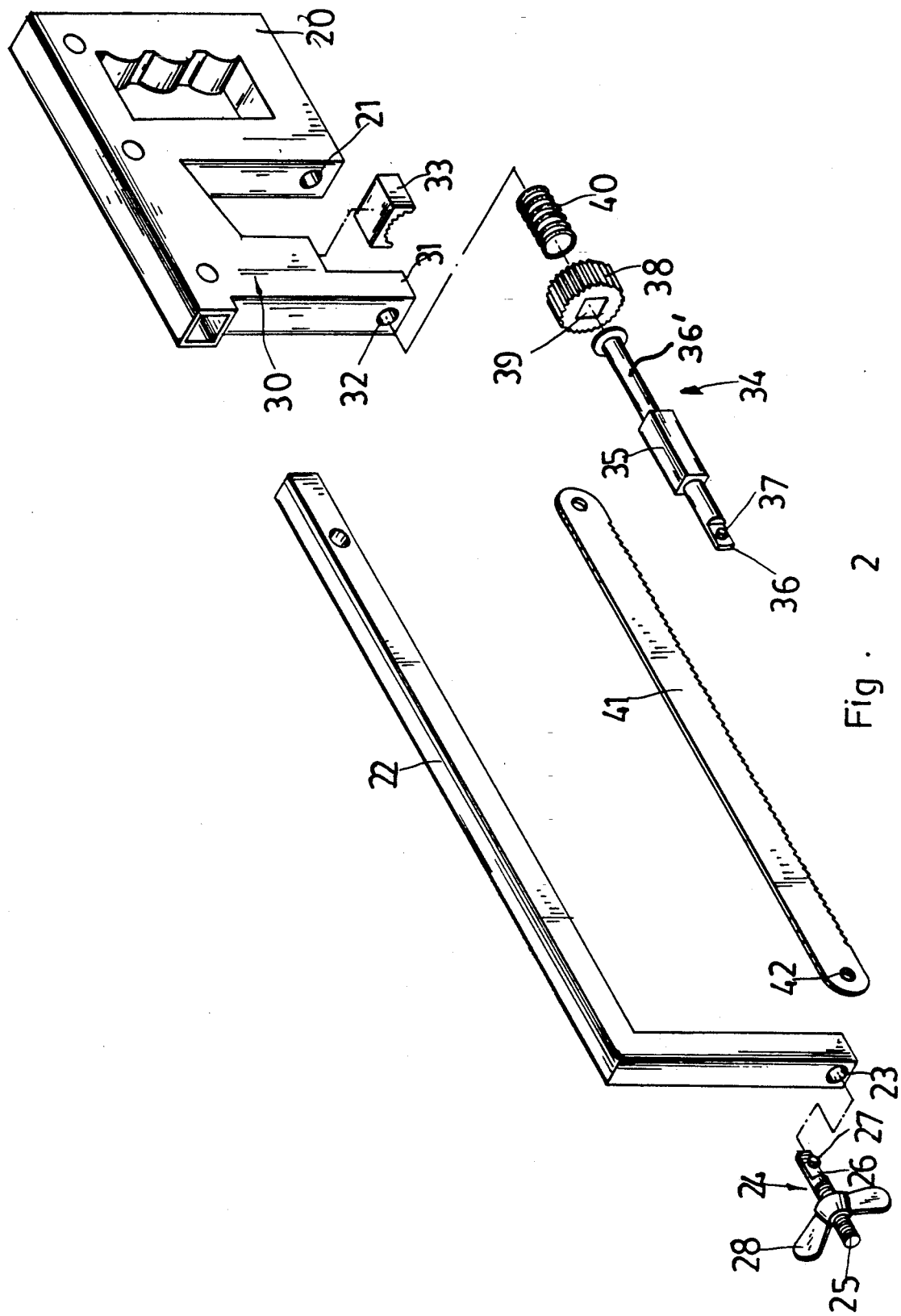
FIG. 2 is an exploded view of a hack saw according to the present invention.
Figure 3:
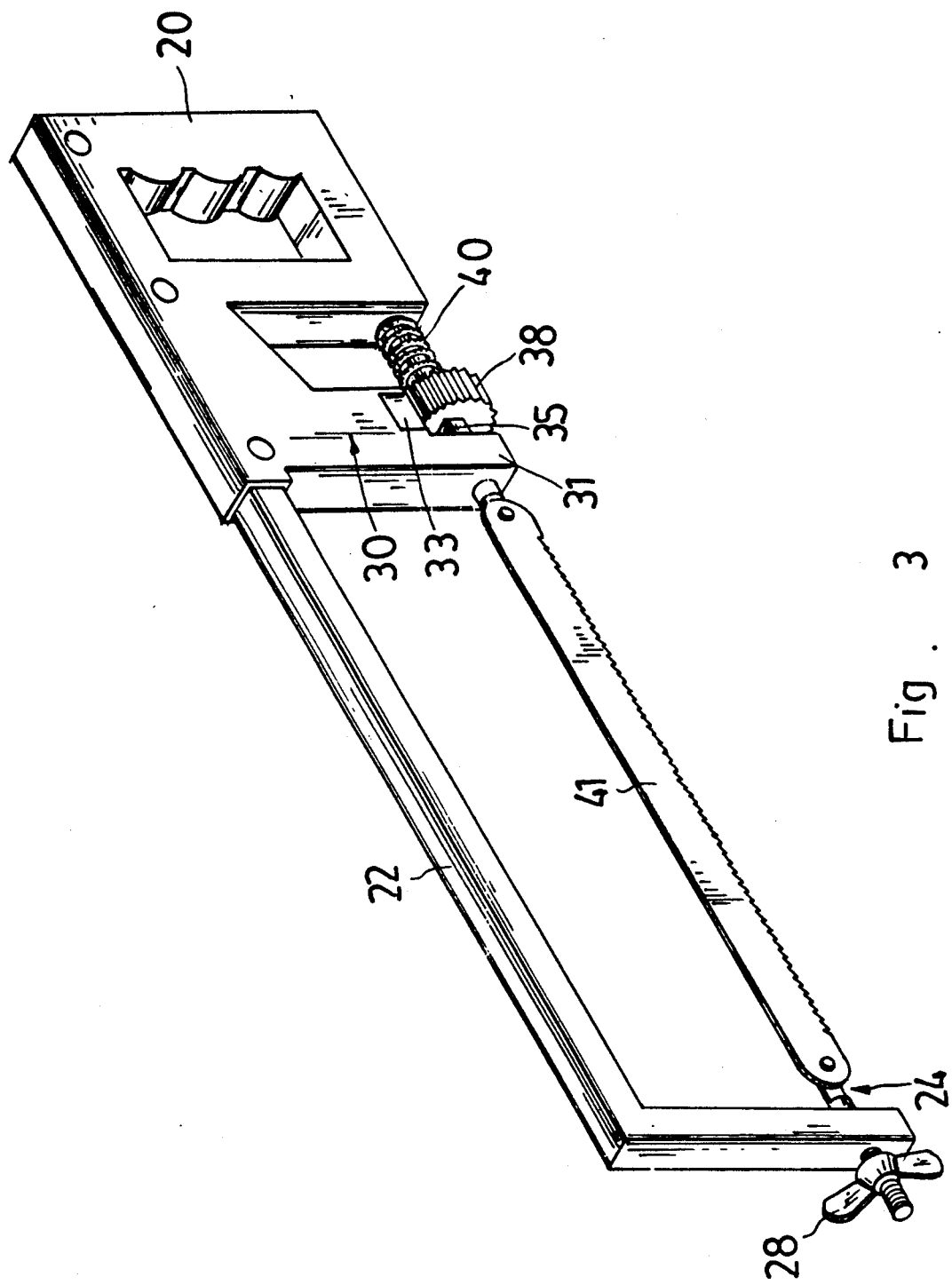
FIG. 3 is an elevational view of the hack saw of FIG. 2.

Referring to FIGS. 2 and 3, a hack saw in accordance with the present invention is generally comprised of a frame 22 extendably fastened to a handle 20 to hold a saw blade 41 by a tightening up rod 24 and an adjusting link 34. The handle 20 comprises a hollow front block 30, which receives the frame 22, a bottom extension 31 vertically extended downwards from the front block 30 at the front. The bottom extension 31 of the front block 30 has a circular through hole 32 spaced from and longitudinally aligned with a circular hole 21 on the handle 20. The frame 22 has a circular through hole 23 through a front end thereof and longitudinally alinged with the circular through hole 32 on the bottom extension 31 of the front block 30 and the circular hole 21 on the handle 20. The adjusting link 34 comprises a rectangular block 35 having a rear extension rod 36' and a side pin 37 on a front extension rod 36 thereof. A toothed locating block 33 is fastened to the front block 30 at the bottom and meshed with a gear 38 mounted on the adjusting link 34. The gear 38 has a rectangular through hole 39 through the center, into which the rectangular block 35 of the adjusting link 34 fits. The front extension rod 36 is inserted through the circular through hole 32 on the bottom extension 31 as the rear extension rod 36' is inserted into the circular hole 21 on the handle 20. A spring 40 is mounted on the rear extension rod 36' of the adjusting link 34 and stopped between the gear 38 and the handle 20. The tightening up rod 24 is comprised of a screw rod 25 on one end screwed up with a wing nut 28, and a rear extension rod 26 with a side pin 27 on an opposite end inserted through the circular through hole 23 on the frame 22 from the front. The saw blade 41 has two pin holes 42 on two opposite ends respectively mounted on the side pin 27 of the rear extension rod 26 of the tightening up rod 24 and the side pin 37 on the front extension rod 36 of the adjusting link 34. When assembled, the tension of the saw blade 41 can be adjusted by turning the wing nut 28 on the screw rod 25 of the tightening up rod 24.

Figure 4:
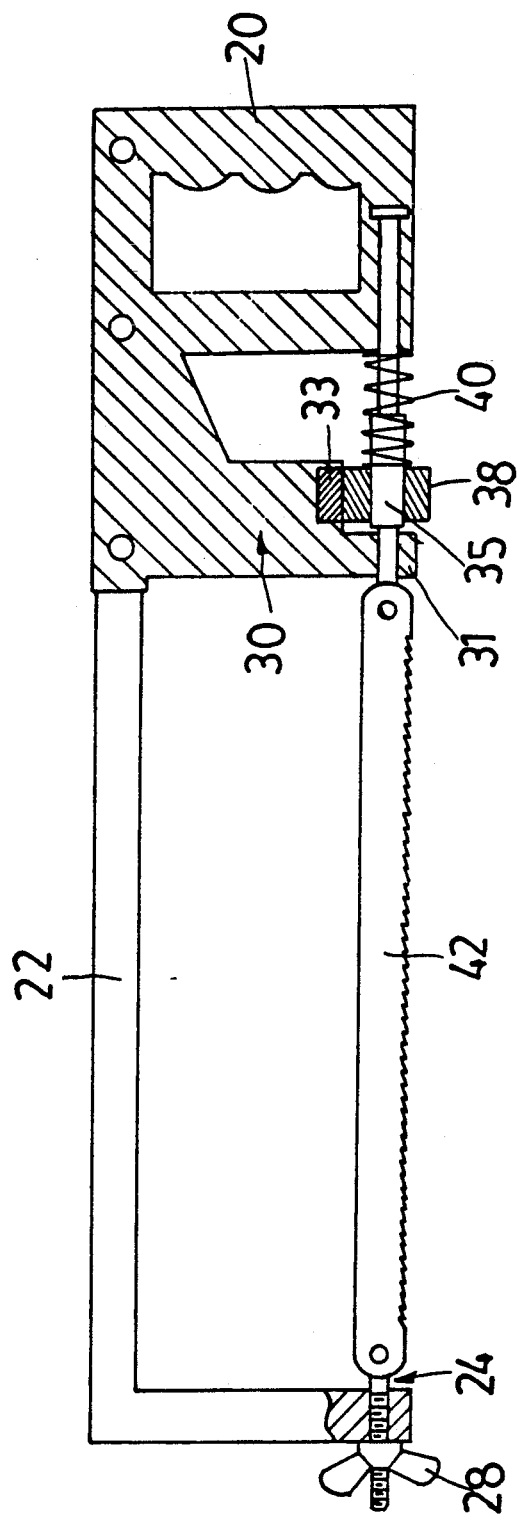
FIG. 4 is a longitudinal sectional view of the hack saw of FIG. 2.

Referring to FIG. 4 and FIG. 3 again, the angular position of the saw blade of the hack saw can be conveniently adjusted for bevel cutting. The tension of the saw blade 41 is loosened by turning the wing nut 28 outwards on the screw rod 25 of the tightening up rod 24, then the gear 38 is moved backwards toward the handle 20 and disengaged from the toothed locating block 33, and then the gear 38 is turned in either direction to drive the adjusting link 34 in tilting the saw blade 41 to the desired angular position. After adjustment, the spring 40 automatically pushes the gear 38 back to its former position in mesh with the toothed locating block 33, and therefore the adjusting link 34 is retained to hold the saw blade 41 in the desired angular position. The aforesaid arrangement allows the saw blade 41 to be turned through 360° angle on the frame 22 and the bottom extension 31 of the front block 30 of the handle 20 and then retained in the desired angular position.

While only an embodiment of the present invention has been shown and described, it will be understood that many changes and modifications may be made thereunto without departing from the spirit and scope of the invention. For example, an angular indexing may be marked on the gear 38 for convenient adjusting.

I claim:

1. A saw blade adjusting device for a hack saw having a frame extendably fastened to a handle to hold a saw blade by a tightening up screw rod and wing nut set, the saw blade adjusting device comprising an adjusting link fastened to said handle to hold either end of said saw blade, a toothed locating block fastened to a front block of said handle, a rectangular block mounted on said link a gear mounted on rectangular block and releasably meshed with said toothed locating block, and a spring mounted on said adjusting link and stopped between said gear and said handle, wherein said gear can be moved backwards along said adjusting link to disengage from said toothed locating block, then rotated in either direction to turn said saw blade through 360° angle via said adjusting link, and then moved back to its former position in mesh with said toothed locating block to hold said adjusting link in keeping said saw blade at the adjusted angular position.

* * * * *